Patented Aug. 26, 1930

1,774,202

UNITED STATES PATENT OFFICE

STEPHEN KISLITZIN, OF SOKOLNIKI, MOSCOW, UNION OF SOCIALIST SOVIET REPUBLICS, ASSIGNOR TO STATE IMPORT AND EXPORT TRADING OFFICE "GOSTORG," OF MOSCOW, UNION OF SOCIALIST SOVIET REPUBLICS

PROCESS FOR THE MANUFACTURE OF A BLACK COLORING MATTER

No Drawing. Application filed November 28, 1928, Serial No. 322,571, and in the Union of Socialist Soviet Republics June 23, 1926.

This invention relates to the production of a black coloring matter.

The invention principally consists in a process in which raw peat is first treated with an aqueous or other solution of alkali or an alkaline earth metal salt, particularly sodium salts, ammonium salts or ammonia, and with an aluminium salt, such as alum, or boron salt, such as borax; then drying and submitting the product to destructive distillation, thereupon wet grinding the residue from the retort and treating the wet mass with a mineral acid such as hydrochloric acid under heat and lastly separating and drying the solid residue which constitutes the desired product.

In carrying out the invention raw peat of ordinary consistency having 83-87 per cent water is submitted to a chemical and technical refinement by an acqueous solution of aluminium and sodium salts.

The process may be carried out for example as follows:—

For about 3600 lbs. of raw peat, the following additional ingredients are used, 180 lbs. common salt dissolved in water, which may consist of marsh-water, in proportion of 36 lbs. of salt to 135 gallons of water. To this are added 18 lbs. aluminium salt such as alum or alum-earth. If the quality of soot is low, then potassium alums in water-solution of 18 lbs. alums in 67 to 80 gallons of water may be used.

The solution of potassium alums and the solution of common salt are to be mingled together in a barrel, vat or any other vessel and gether in a barrel, vat or any other vessel and thoroughly mixed with the peat mass. The quality of the final product will be better if the peat mass is properly mixed together with the said solutions. After the treatment of the peat mass by means of the aqueous solutions of aluminium and sodium salts, the product obtained is dried in the open air until it will contain the desired percentage of moisture in the same manner as peat is usually dried without any special methods. The turning, stowage in 5 and 50 piece columns, framings, piling and stacking proceeds as at the production of ordinary dried peat, but it is recommended to remove the peat from the marsh sometime before its use because the peat, salt and alums will be in this case much more hygroscopic.

After the air-drying has been effected the peat mass is passed through a disintegrating machine such as a Wolf-machine, where it is disintegrated into small pieces and transferred to cylinders in which it is mixed with gas bitumen and/or naphtha-residues or other tar substances in the proportion of 5 to 10 per cent gas bitumen. It is then conveyed to retorts where it is heated without access of air to a suitable temperature.

The moment of termination of the distillation is determined by the ceasing of evaporation of volatile products.

The residue obtained from the retorts is quenched with water and run into a colloid mill and the ground liquid mass obtained is then poured into vats and treated with a mineral acid for instance hydrochloric acid and boiled thoroughly by injecting steam therein during 2 to 4 hours depending upon the required quality. The foam formed during the steam treatment is removed.

After the precipitate has been allowed to settle the water is conveyed away by means of a siphon. Then, by means of a valve at the bottom, the black coloring matter can be removed for use in coloring and silicate works. The remaining mass is poured into other vats, where it is freed from acids and other admixtures.

After refinement the mass is conveyed into the filtering presses or into the vacuum or other drying apparatus.

After drying the mass is rubbed to the required fineness and then it is ready for the packing.

For special purposes the product is treated in drum-mills, this method gives to the product particular downiness and lightness.

Having now described my invention, what I claim as new and desire to secure by Letters Patent is:—

1. Process of manufacturing a black pigment which consists in treating raw peat with an aqueous solution of an alkali metal salt and an aluminium salt, drying the peat thus treated, mixing the dry disintegrated peat with a bituminous material, destructively distilling the mixture obtained, wet grinding the solid residue from the distillation, treating the wet mass with a mineral acid under heat, separating, washing and drying the mass which constitutes the desired product.

2. Process of manufacturing a black pigment which consists in treating raw peat with an aqueous solution of common salt and alum, drying the product, disintegrating and mixing the same with tar, destructively distilling the mixture obtained, wet grinding the solid residue from the destructive distillation, treating the wet mass with hydrochloric acid under heat, and separating, washing, drying and grinding the mass which constitutes the desired product.

In testimony whereof I have signed my name to this specification.

STEPHEN KISLITZIN.